United States Patent [19]

Takada

[11] Patent Number: 4,896,556
[45] Date of Patent: Jan. 30, 1990

[54] SHIFT LEVER KNOB

[75] Inventor: Toshiaki Takada, Sagamihara, Japan

[73] Assignee: Nissan Motor Co., Ltd., Japan

[21] Appl. No.: 191,995

[22] Filed: May 9, 1988

[30] Foreign Application Priority Data

May 8, 1987 [JP] Japan .............................. 62-68715[U]

[51] Int. Cl.⁴ .......................... G05G 1/04; G05G 1/10
[52] U.S. Cl. ....................................... 74/523; 74/543;
74/553; 16/121
[58] Field of Search ...................... 74/523, 543, 473 P,
74/473 R, 548, 553; 16/121, 118, DIG. 30

[56] References Cited

U.S. PATENT DOCUMENTS

| 3,561,281 | 2/1971 | Wilfert | 74/543 X |
| 3,750,492 | 8/1973 | Holmes, Jr. | 74/523 |
| 3,795,156 | 3/1974 | Neuscheler | 74/543 X |

FOREIGN PATENT DOCUMENTS 1279914 6/1972 United Kingdom ................. 74/523

Primary Examiner—Rodney M. Lindsey
Attorney, Agent, or Firm—Leydig, Voit & Mayer

[57] ABSTRACT

A shift lever knob consists of a surface layer made of a synthetic resinous material, an insert made of a synthetic resinous material and having a threaded portion in to which a shift lever is to be screwed, and a filling disposed between the surface layer and the insert. The filling is made of a metal having a large specific gravity.

8 Claims, 2 Drawing Sheets

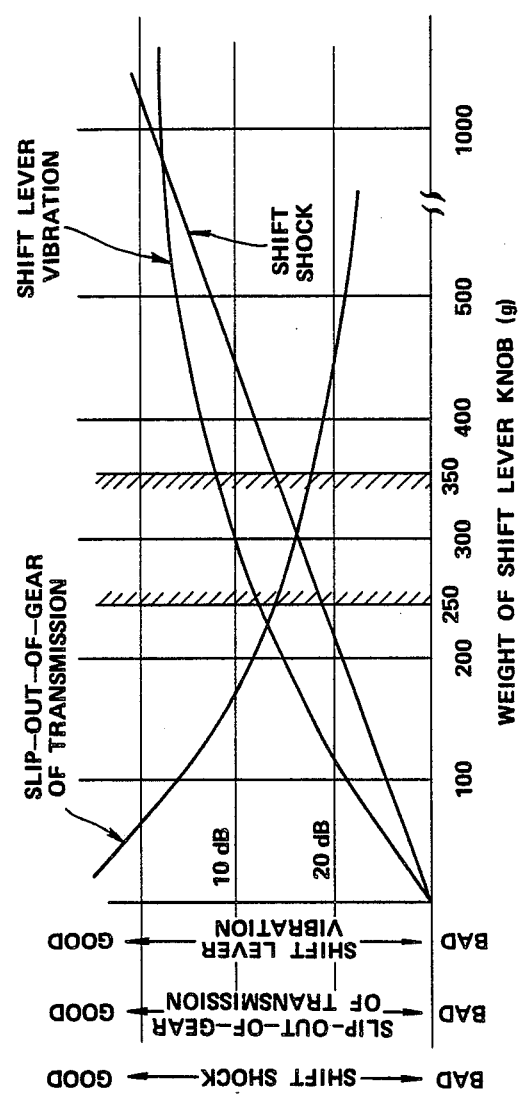

SHIFT LEVER KNOB

BACKGROUND OF THE INVENTION

1. Field of the Invention

The present invention relates to a knob attached to an upper end of a shift lever of a manual transmission.

2. Description of the Prior Art

A known shift lever knob consists of a surface layer made of soft vinyl chloride, an insert made of a synthetic resinous material and screwed onto an upper end of a shift lever and a filling made of soft vinyl chloride and disposed between the surface layer and the insert. This shift lever knob is light in weight, e.g., weighs about 100 g since it is entirely made of a synthetic resinous material, resulting in the problem that the shift lever vibrates efficiently in response to vibrations of the transmission.

Another known shift lever knob consists of a surface layer made of soft vinyl chloride and an insert-and-filling made of cast iron. This shift lever knob is too heavy since it is entirely made of cast iron except for the surface layer, resulting in the problem that the transmission is liable to slip out of gear and the structural strength of the shift lever is liable to be undesirably low. Another problem is that there is a difficulty of locating the knob so that the shift pattern faces the front of the vehicle since the core and the shift lever are engaged at their threaded portions made of metal.

SUMMARY OF THE INVENTION

In accordance with the present invention, there is provided a novel shift lever knob which comprises a surface layer made of a synthetic resinous material, an insert made of a synthetic resinous material and having a threaded portion into which a shift lever is to be screwed and a filling disposed between the surface layer and the insert. The filling is made of a metal having a large specific gravity.

The above structure is effective for solving the above noted problems inherent in the prior art shift lever knob.

It is accordingly an object of the present invention to provide a novel shift lever knob which can effectively attenuate shift lever vibration.

It is a further object of the present invention to provide a novel shift lever knob which can effectively prevent transfer of vibrations from the transmission to the driver's hand.

It is a further object of the present invention to provide a novel shift lever knob which can attain an improved operational feel.

It is a further object of the present invention to provide a novel shift lever knob which is effective for preventing the transmission from slipping out of gear.

It is a further object of the present invention to provide a novel shift lever knob which can be easily installed in position.

It is a further object of the present invention to provide a novel shift lever knob which makes it easy to locate a shift pattern plate in position.

BRIEF DESCRIPTION OF THE DRAWINGS

FIG. 4 is a graph of slip-out-of-gear factor, shift lever vibration and shift shock in relation to knob weight.

DETAILED DESCRIPTION OF THE PREFERRED EMBODIMENT

Figure 1:
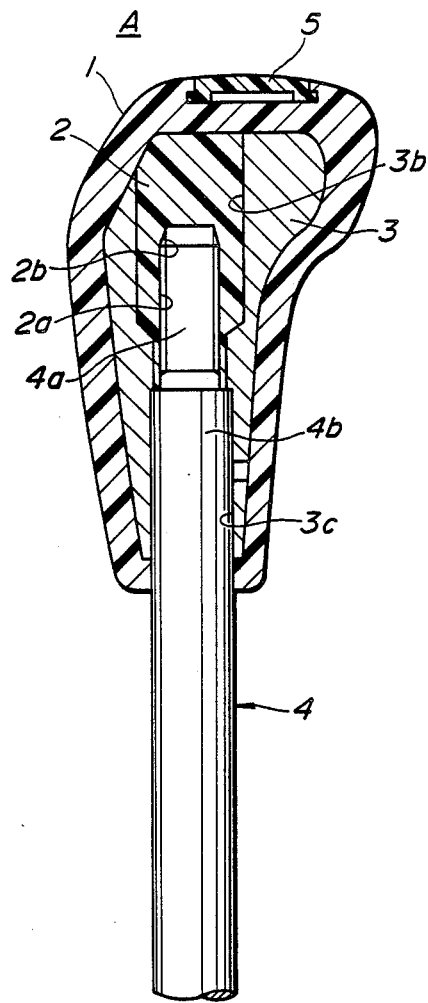
FIG. 1 is a sectional view of a shift lever knob according to an embodiment of the present invention.

A shift lever knob is generally indicated in FIG. 1 by "A" and shown as comprising a surface layer 1 serving as an external covering of the knob "A", an insert or core 2 having a threaded portion 2a into which a threaded upper end of a shift lever 4 is screwed and a filling 3 disposed between the surface layer 1 and the insert 2.

The surface layer 1 is made of a soft vinyl chloride or the like so as to be elastically deformable a little when grasped by a driver, whereby to attain a soft touch of the knob "A" is attenuated.

A shift pattern plate 5 is embedded in the surface layer 1 at the top end of the knob "A".

The insert 2 is made of a thermoplatic synthetic resinous material, though harder than the surface layer 1, so that the core 2 is adjustable in position relative to the shift lever 4 by adjusting the amount of tightening.

The shift lever 4 has at the upper end thereof a threaded portion 4a whilst the insert 2 has the above described threaded portion 2a in the place corresponding to the threaded portion 4a.

The filling 3 is made of metal, for example, cast iron, having a large specific gravity.

Figure 2:
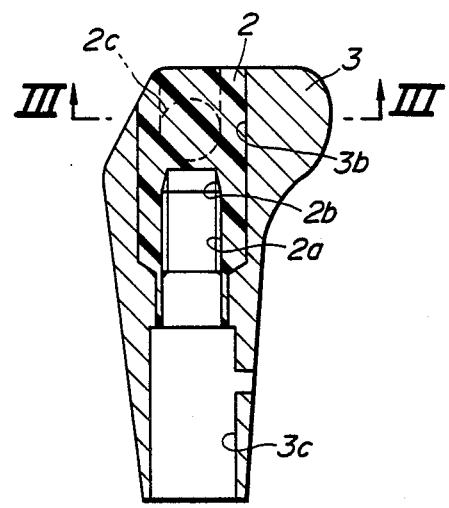
FIG. 2 is a sectional view of an insert and a filling of the shift lever knob of FIG. 1.
Figure 3:
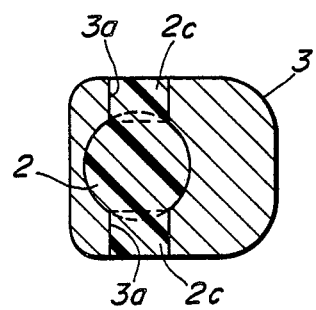
FIG. 3 is a sectional view taken along the line III—III of FIG. 2.

The core 2 and the filling 3 are rotationally fast relative to each other as shown in FIGS. 2 and 3. As illustrated, the filling 3 has a locking hole 3a extending between the opposed left and right ends thereof. The insert 2 has projections 2c and 2c disposed in the locking hole 3a. The insert 2 with the locking projections 2c and 2c is embedded in the filling 3 by being moulded in the space of the filling 3.

More specifically, the shift lever 4 has at the upper end thereof a guide portion 4b which is located longitudinally inward of the threaded portion 4a. The filling 3 has a longitudinal opening including an upper opening portion 3b for fittingly receiving therein the insert 2 and a lower opening portion 3c for fittingly receiving therein the guide portion 4b of the shift lever 4. The filling 3 further has a transverse opening serving as the above described locking hole 3a. In the above, it is to be noted that the engagement of the filling 3 and the shift lever 4 at the opening portion 3c and the guide portion 4b is quite effective for rigidly connecting the knob "A" to the shift lever 4.

The total weight of the surface layer 1, insert 2 and the filling 3 is determined so as to be within the range between 300 g±50 g based on the fact that, as shown in FIG. 4, the heavier the knob "A" becomes the less the shift lever vibration and the shift shock becomes while on the contrary the heavier the knob "A" becomes the more likely it is to slip out of the gear of the transmission when the above described total weight is within the above described range not only the shift lever vibration and the shift shock are reduced or attenuated considerably but the slip-out-of-gear of the transmission is prevented efficiently.

In installation, the knob "A" is screwed onto the threaded upper end 4a of the shift lever 4. In this instance, the knob "A" can be easily tightened to its position where the shift pattern plate 5 faces the front of the vehicle by the effect of the incomplete thread 2b into which the threaded end 4a of the shift lever 4 is adjustably inserted.

In use, the knob "A" with the filling 3 made of cast iron of a large specific gravity can efficiently reduce or attenuate the shift lever vibration and the shift shock particularly when the total weight of the knob "A" is determined so as to be within the range of 300 g±50 g, thus improving the operation feel of the knob "A" and assuredly preventing the the slipping out of gear of the transmission.

From the foregoing, it will be understood that since the insert 2 is made of a synthetic resinous material while at the same time the filling 3 is made of cast iron of a large specific gravity, not only the knob "A" is increased in weight to reduce or attenuate the shift lever vibration but the knob "A" can be located in position easily.

It will be further understood that since the filling 3 is adapted to be rotationally fast relative to the insert 2 when moulded in the inner space of the insert 2, rotational interlocking of the insert 2 and the filling 3 can be attained without requiring any additional component parts, thus reducing the number of component parts necessitated and the number of manufacturing processes.

It will be further understood that when the total weight of the knob "A" is determined so as to be within the range of 300 g±50 g, not only the shift lever vibration and the shift shock can be considerably reduced or attenuated but the slip-out-of-gear of the transmission is efficiently prevented.

What is claimed is:

1. A shift lever knob comprising:
   a surface layer made of a synthetic resinous material;
   an insert disposed inside said surface layer and made of a synthetic resinous material and having a threaded portion for attachment to a shift lever; and
   a metal filling disposed inside said surface layer between said surface layer and said insert
   for adjusting the total weight of said knob to a predetermined value.

2. A shift lever assembly comprising:
   a shift lever having a threaded upper end portion; and
   a knob having a surface layer made of a synthetic resinous material, an insert disposed inside said surface layer made of a synthetic resinous material including a threaded portion screwed onto said threaded upper end portion of said shift lever,
   and a metal filling disposed inside said surface layer between said surface layer and said insert
   for adjusting the total weight of said knob to a predetermined value.

3. A shift lever assembly as set forth in claim 2 wherein said metal filling is cast iron.

4. A shift lever assembly as set forth in claim 3 wherein said metal filling has a longitudinal opening receiving therein said insert and said shift lever and a transverse opening, said insert including a projection received in said transverse opening for rotationally fixing said metal filling relative to said insert.

5. A shift lever assembly as set forth in claim 4 wherein said shift lever includes a guide portion located longitudinally inward of said threaded portion thereof, and said longitudinal opening includes a longitudinally outer portion fittingly receiving said guide portion of said shift lever and an inner portion receiving said insert.

6. A shift lever assembly as set forth in claim 1 wherein the size of said filling is determined so that the total weight of said knob is within the range between 300 g ± 50 g.

7. A shift lever assembly as set forth in claim 2 wherein said insert is embedded in said filling.

8. A shift layer made of a synthetic resinous material;
   an insert disposed inside said surface layer made of a synthetic resinous material and including a threaded portion for attachment to a shift lever; and
   a filling of cast iron disposed inside said surface layer between said surface layer and said insert such that the weight of said knob is in the range of 300±50 grams.

* * * * *